United States Patent [19]

Graham et al.

[11] Patent Number: 5,783,779
[45] Date of Patent: Jul. 21, 1998

[54] ADJUSTABLE BUSWAY ELBOW SECTION

[75] Inventors: Eric J. Graham, Farmington, Conn.;
Clarence W. Walker, Selmer, Tenn.;
Louis A. Rosen, Wallingford, Conn.

[73] Assignee: General Electric Company, New York, N.Y.

[21] Appl. No.: 702,775

[22] Filed: Aug. 23, 1996

[51] Int. Cl.⁶ .................................................. H02G 5/08
[52] U.S. Cl. ........................................ 74/88 B; 439/213
[58] Field of Search ........................... 174/68.2, 70 B, 174/71 B, 72 B, 88 B, 99 B, 133 B; 439/115, 116, 119, 207, 210, 212, 213, 214

[56] References Cited

U.S. PATENT DOCUMENTS

| 3,004,097 | 10/1961 | Johnston et al. | 174/88 B |
| 3,287,487 | 11/1966 | Fehr, Jr. | 174/71 B |
| 3,459,874 | 8/1969 | Fouse et al. | 174/88 B |
| 4,213,003 | 7/1980 | Carlson | 174/88 B |

FOREIGN PATENT DOCUMENTS

| 9629768 | 9/1996 | WIPO | H02G 5/06 |
| 9629769 | 9/1996 | WIPO | H02G 5/06 |

OTHER PUBLICATIONS

U.S. Application — General Electric Company Docket No. 41PR-7353, Ser. No. 08/692564 Filed Aug. 6, 1996 Inventor Graham et al "Thermally Efficient Power Busway Systen With Integral Clamping Mechanism".

U.S. Patent Application Ser. No. 08/411,256 Filed Mar. 27, 1995 Inventor Graham et al "Electrical Power Busway System Connector Joint".

Primary Examiner—Kristine L. Kincaid
Assistant Examiner—Joseph Waks
Attorney, Agent, or Firm—Carl B. Horton; Fishman, Dionne, Cantor & Colburn

[57] ABSTRACT

A busway construction with a standard elbow section that can be adjusted to a wide range of positions to eliminate the need for specialized elbow sections. This adjustable elbow standard busway section with a full-range rotation is designed to connect to other sections of busway which are at non-standard angles to each other.

7 Claims, 6 Drawing Sheets

ADJUSTABLE BUSWAY ELBOW SECTION

BACKGROUND OF THE INVENTION

Our invention relates to an angle-type or elbow fitting to join two adjacent busway sections in an electric power distribution system.

Busway runs typically consist of a multitude of long, straight sections of busway connected by elbow pieces for maneuvering around fixed building entities such as columns and piping. These elbow busway sections are typically 90 degrees in orientation from the input busway section to the output busway section. However, many busway assemblies require elbow sections which are more or less than 90 degrees. To meet this requirement, a custom-designed elbow section is fabricated, adding significant costs to the busway installation. More often than not, when dealing an awkward angle of elbow rotation, design measurements for the unique construction are inaccurate. This error is usually only found during installation, forcing refabrication or design modification of the elbow at significant losses in time and cost.

U.S. Pat. No. 3,287,487 titled "Universal Busway Elbow," provides a universal busway elbow fitting for busway runs requiring a 90 degree turn such as a corner or changing turn directions to the left, right, up, or down. The fitting is provided with a pair of electrical terminal assemblies that are interconnecting with each other by means of flexible conductors. Each terminal assembly comprises an enclosure secured in an L-shaped base. The fitting enables the busway to turn a corner in any right, left, up, or down direction. The construction method is complex and the invention is limited in its application.

U.S. Pat. No. 3,459,874 entitled "Bus Duct Having Angularly Adjustable Sections" describes a busway construction with angularly adjustable sections which can be connected to a similar section as either a straight length connection or angle-type connection. The elbow comprises a pair of bus duct sections joined and rotated about a connecting bolt with cooperating plates as housing. There are a few shortcomings to the aforementioned approach. The design is complex and not field-modifiable with the elbow section being integral to the assembly, and the cover plate has to be unique for each busway assembly.

SUMMARY OF THE INVENTION

Accordingly, it is an object of this invention to provide a standard elbow part which adjusts to a wide range of positions to eliminate the need for specialized elbow manufacturing, giving a busway installer the flexibility to position an elbow in an optimal position during field installation.

This invention is an improvement over the prior art with a standard and adjustable flatwise busway elbow section which can be adjusted to any angle and other sections of busway which may be at non-standard angles to each other. The construction utilizes a splice-plate style pressure joint at the intersection of the two busway sections. The opposing bus-bars across the joint are offset with respect to one another to retain phase centering across the splice-plate joint. Metal housing plates are used to enclose the center splice-plate joint section.

DESCRIPTION OF THE PREFERRED EMBODIMENT

Figure 1:
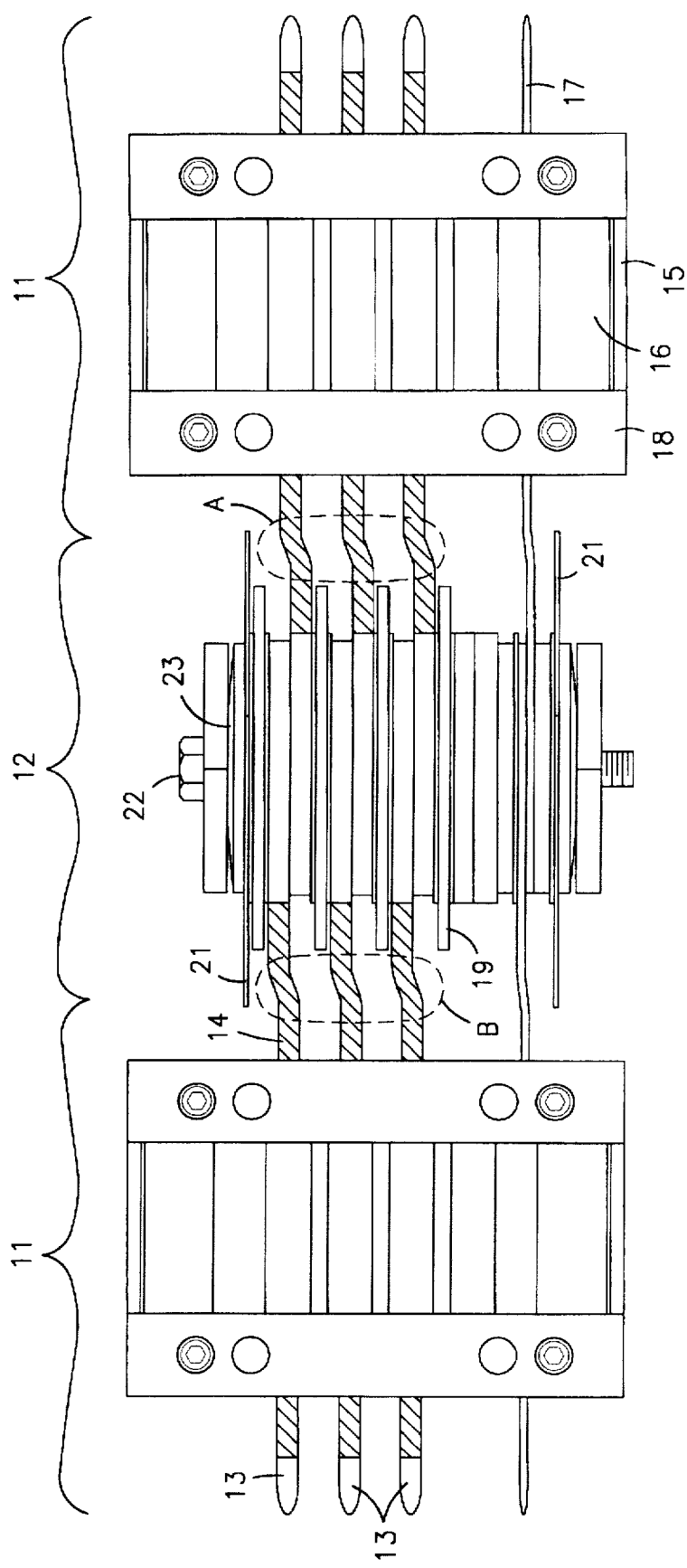
FIG. 1 is a side view of an adjustable elbow section in accordance with the instant invention as a straight connector with the center housing cover removed.

The adjustable busway elbow section according to the invention is shown in FIG. 1 with two bus bar end stubs 11 being permanently connected to a removable splice-plate pressure joint 12 at the center. The splice-plate pressure joint 12 is as described in the copending U.S. patent application Ser. No.08/411,256, filed on Mar. 27, 1995, entitled "Electrical Power Busway System Connector Joint," commonly assigned to General Electric Company and which is hereby incorporated for the purpose of reference. The end stubs 11 comprise electrically insulated bus bar conductors 13 and a ground bar 17, all housed in an aluminum housing assembly consisting of a housing plate 16 and a housing rail 15. The end stubs and the housing assembly can be constructed in a manner similar to that described in co-pending U.S. patent application Ser. No. 08/692564, filed on Aug. 6, 1996, entitled "Thermally Efficient Power Busway System With Integral Clamping Mechanism," commonly assigned to General Electric Company, which is hereby incorporated for the purpose of reference.

Opposing bus bar support clamps 18 are placed at opposite ends of the end stubs 11 to keep the phase bars 13 and ground bar 17 from sliding out of the housing assembly. As the end stubs enter the splice-plate pressure joint region 12, the phase bars 13 and ground bar 17 are offset by one-half the thickness of the bar (regions A and B) to retain centerline consistency between opposing sections of phase bars 13 and ground bars.

The pressure joint 12 functions as a phase and ground current conductor to the adjoining end stubs 11. The joint 12 also electrically insulates the phase bars 13 from each other and from the ground bar 17. In the region of the splice-plate joint 12, the two sets of opposing and common phase bars 13 overlap one another, with insulating sheets 19 separating each adjacent set of common phase bars 13 from one another. The insulating sheets 19 also separate the phase bars 13 from the ground bar 17, as well as the phase bars 13 from the housing sides 21. Housing sides 21 function as grounding agents during service. Electrical conductivity is achieved across the joint when the through-bolt 22 is tightened. The tightening of through-bolt 22 acts upon a spring or Belville washer 23 to create a force distribution pattern putting pressure on the components of joint 12, clamping the joint tightly together.

Figure 2:
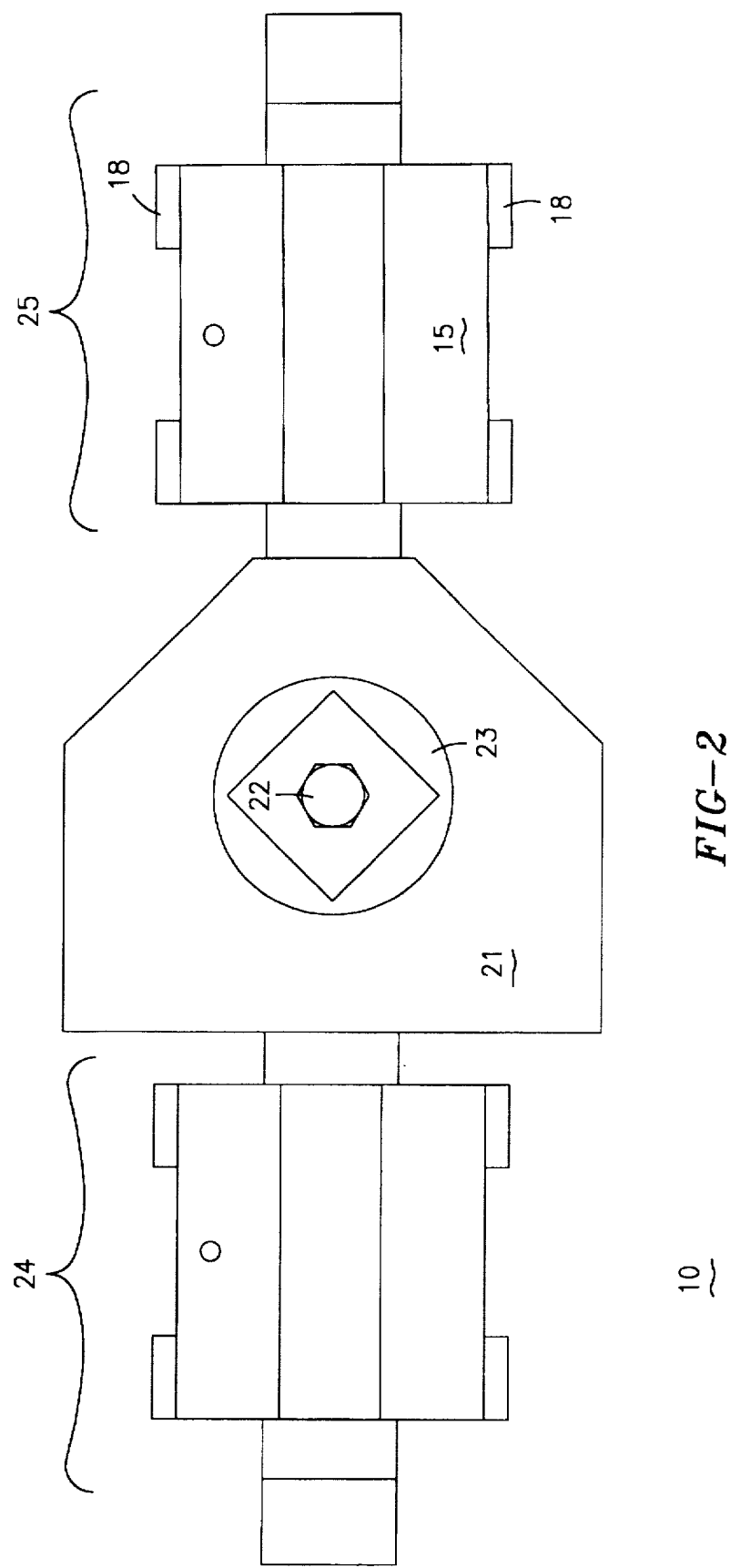
FIG. 2 is a top view of the adjustable elbow section in FIG. 1 (as a straight connector or at a 180 degree angle).
Figure 3:
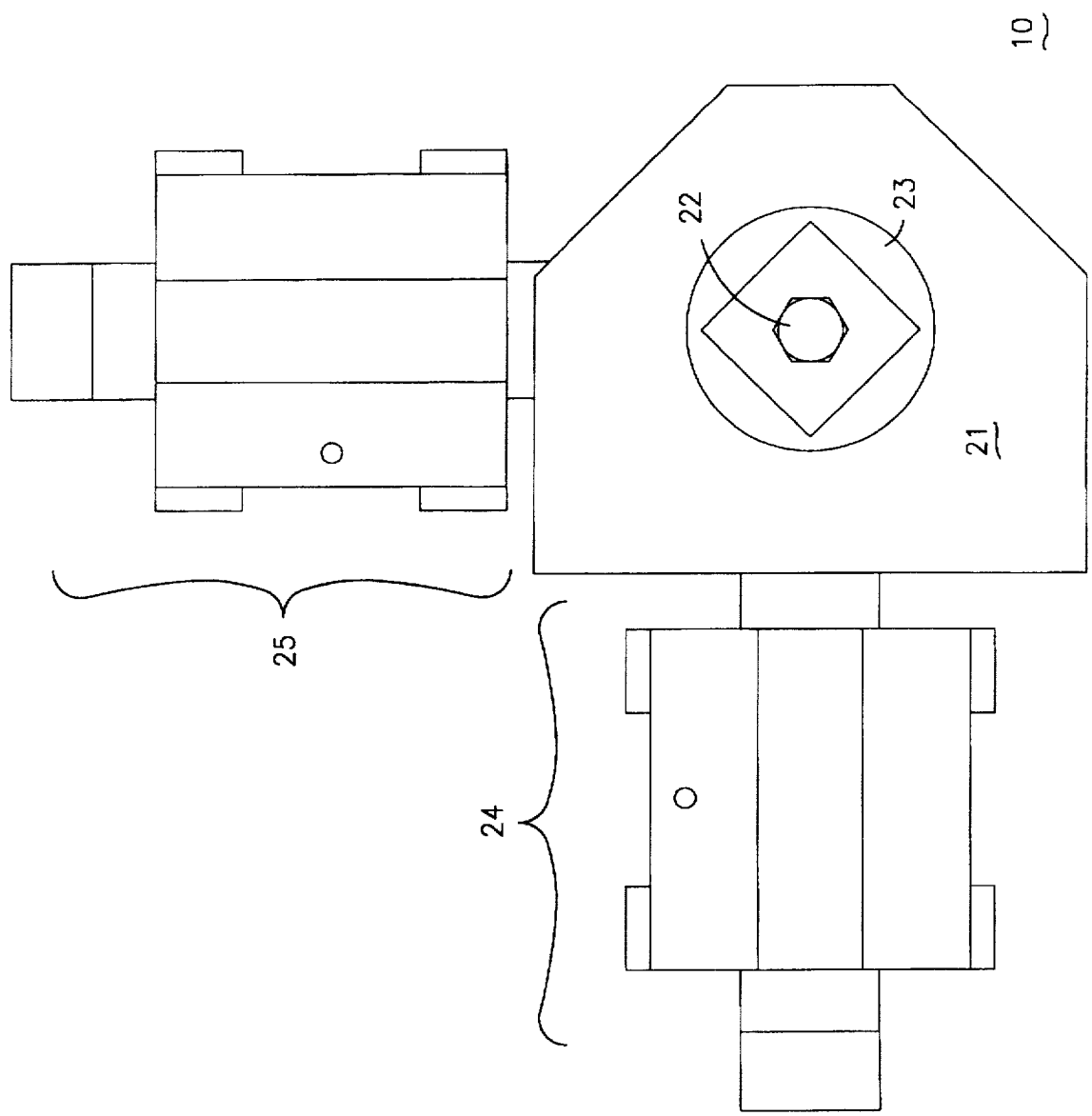
FIG. 3 is a top view of the adjustable elbow section at a 90 degree angle.
Figure 4:
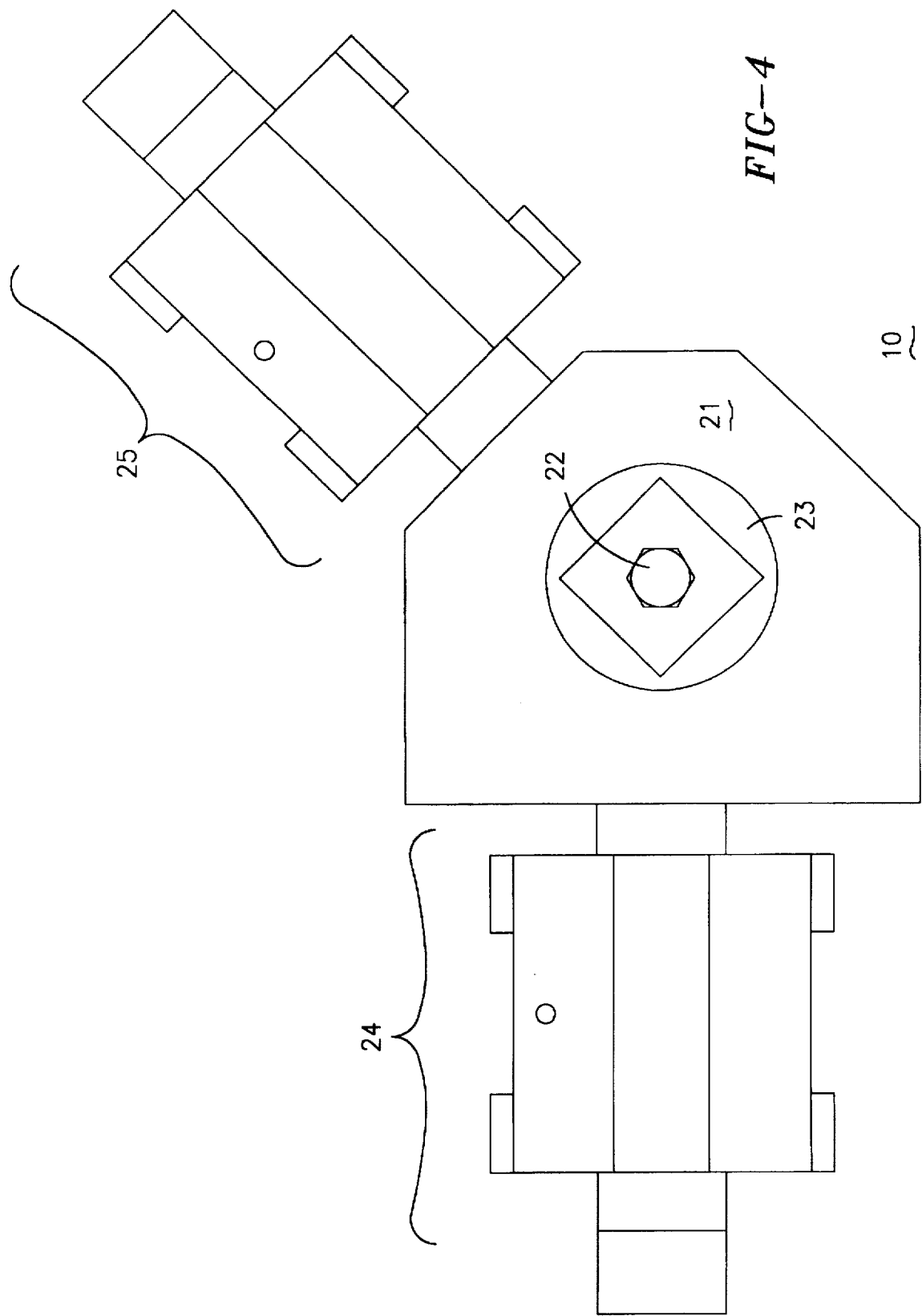
FIG. 4 is a top view of the adjustable elbow at a 45 degree angle.

FIGS. 2 through 4 show the adjustable busway elbow section 10 in the minimum, maximum, and intermediate range of angles to which it can be adjusted. To adjust the adjustable section, the through bolt 22 is loosened until the pressure exerted upon the joint 12 is low enough so that the right end stub 25 can rotate relative to the left end stub 24. FIG. 2 shows the adjustable elbow 10 in a 180 degree orientation. FIG. 3 shows the adjustable elbow 10 in a 90 degree orientation. FIG. 4 shows the adjustable elbow 10 in a 135 degree orientation. The adjustable elbow of the instant invention can be adjusted to any angle between 90 and 180 degrees in an infinite number of incremental positions.

Figure 5:
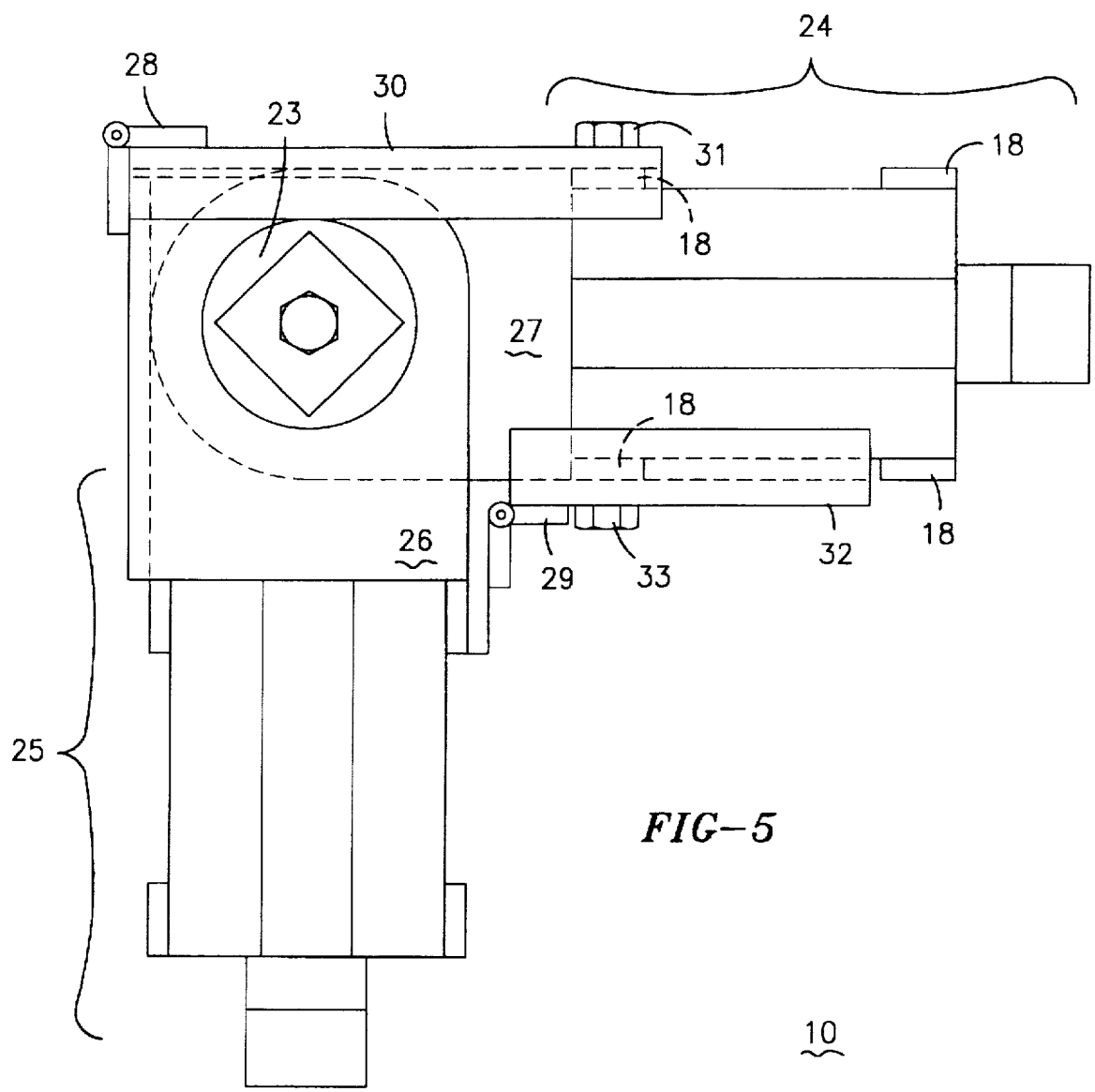
FIG. 5 is a top view of the adjustable busway elbow of the instant invention, showing the housing connections at a 90 degree angle.
Figure 6:
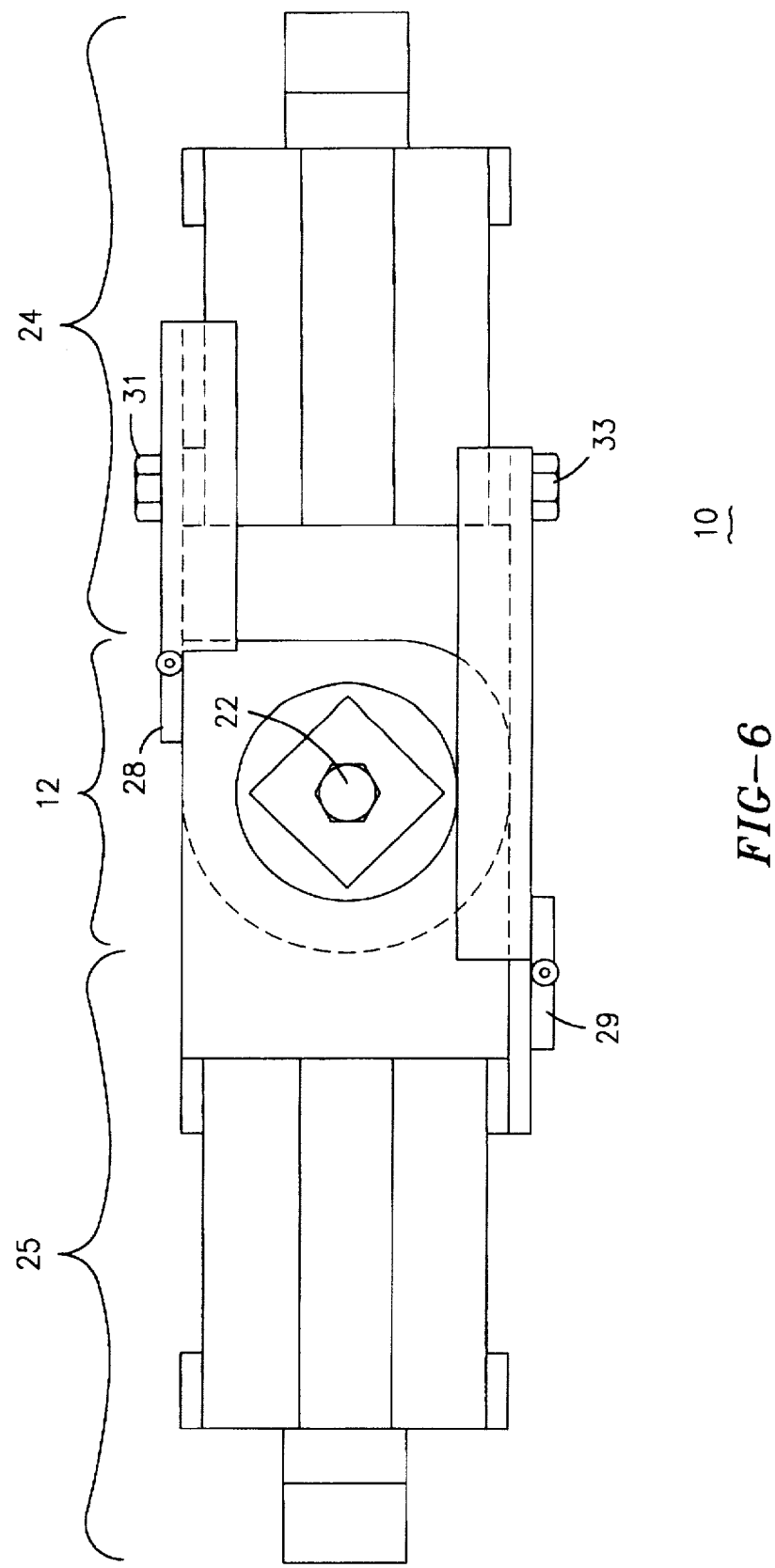
FIG. 6 is a top view, showing the housing connections of the adjustable busway elbow at a 180 degree angle.

FIGS. 5 and 6 are top views of the adjustable elbow section 10 in its maximum and minimum positions, showing the metallic housing protecting the pressure joint 12 from inadvertent external contacts. The housing assembly consists of a top (shown) and bottom (not shown) fixed housing piece 26 bent in a U-shape and attached firmly to the top (shown) and bottom (not shown) housing plates on an end stub 25. Additionally, a top (shown) and bottom (not shown) fixed second housing piece 27 is permanently connected to the top (shown) and bottom (not shown) housing plates of the second end stub 24. The second housing piece 27 is also shaped in a U-shaped fashion to allow the movement of the housing in conjunction with the end stub as the elbow is adjusted. Both first and second housing pieces 26 and 27 are located underneath the Belville washers 23 which are located at the top and bottom sides of the pressure joint 12. A first piano hinge 28 is attached to the outside corner of the first housing 26 and a U-shaped sliding housing plate 30. The sliding housing plate 30 is used to cover the seams and provide mechanical stability to the elbow section. There are two slotted openings along the side of the sliding housing through which two cap screws 31 are fitted. The two cap screws 31 tightening the right sliding housing plate 30 are screwed into threaded holes in outside bus bar support sides 18. There is also a second piano hinge 29 which is attached to the inside corner of the first housing 26 and a left sliding housing plate 32. Cap screws 33 fitted through slotted openings along the side of the sliding housing plate 32 are screwed into threaded holes in inside support side 18 to tighten sliding housing plate 32.

FIG. 6 shows the same detail as in FIG. 5, except that the adjustable elbow section 10 now is in its minimum position of 180 degrees, to illustrate the movement of the housing parts during adjusting. In order to rotate the adjustable elbow section 10 from its initial position illustrated in FIG. 5, the through bolt 22 is loosened sufficiently to release clamping pressure between like phase bars and insulating barriers. Next, cap screws 31 and 33 are loosened to allow the first and second sliding housings 30 and 32 to freely slide relative to the end stub 24. Piano hinges 28 and 29 rotate 90 degrees from their original position in FIG. 5 in order to retain dimensional relationships between the sliding housing pieces. When the adjustment to the angle of the adjustable elbow 10 is complete, through bolt 22 is then re-tightened to firmly clamp the conducting and insulating sheets of the splice-plate joint 12 together. Finally, cap screws 31 and 33 are tightened to secure all housing pieces in place and keep the entire assembly rigid.

What is claimed is:

1. An adjustable busway elbow for interconnecting a pair of adjacent busway sections; said adjustable busway elbow comprising:

a first bus bar end stub having a plurality of electrically insulated first bus bar conductors, each of said first bus bar conductors having a first end portion and a second end portion, said first end portions being equi-spaced;

a second bus bar end stub having a plurality of electrically insulated second bus bar conductors, each of said second bus bar conductors having an opposing first end portion and an opposing second end portion, said opposing first end portions being equi-spaced;

a pressure joint disposed between said first bus bar end stub and said second bus bar end stub to electrically connect each of said second end portions of said first bus bar conductors to each of said opposing second end portions of said second bus bar conductors to form pairs of electrically-connected first and second bus bar conductors;

at least one of said second end portion and said opposing second end portion of each of said pairs of electrically-connected first and second bus bar conductors being offset to retain said frist end portion and said opposing first end portion of each of said pairs of electrically-connected first and second bus bar conductors in planar alignment;

said pressure joint comprising a pair of opposing side pieces, a plurality of electrical insulating plates intermediate each of said pairs of electrically connected first and second bus bar conductors and said opposing side pieces, and a fastener extending through openings in said side pieces, said electrical insulating plates, and each of said pairs of electrically-connected first and second bus bar conductors to thereby connect said insulating plates and each of said pairs of electrically-connected first and second bus bar conductors in a compact relationship, wherein said fastener may be loosened and tightened to adjust and secure said side pieces, said insulating plates, and each of said pairs of electrically-connected first and second bus bar conductors together.

2. The adjustable busway elbow of claim 1, further comprising at least a pair of first and second housing pieces protecting a top portion and bottom portion of said pressure joint from inadvertent external contacts, said housing pieces are generally U-shaped allowing movement of said first and second bus bar end stubs relative to each other when said pressure joint is adjusted.

3. The adjustable busway elbow of claim 2, further comprising a pair of first and second sliding housing plates to provide mechanical stability, said first and second housing plates are connected to a pair of first and second piano hinges respectively and slidably connected to support sides of said first bus bar end stub by cap screws fitted through a slot hole in each of said housing plates, said first and second hinges being secured between said housing pieces at diagonally opposing corners.

4. The adjustable busway elbow of claim 1, further comprising support sides enclosing said first and second bus bar conductors.

5. The adjustable busway elbow of claim 1 wherein said second end portion and said opposing second end portion of each of said pairs of electrically-connected first and second bus bar conductors are offset by one half of their respective thickness to retain said first end portion and said opposing first end portion of each of said pairs of electrically-connected first and second bus bar conductors in planar alignment.

6. The adjustable busway elbow of claim 1, further comprising a spring washer intermediate one of said opposing side pieces and an end portion of said fastener of said pressure joint, which exerts a force distribution pattern clamping said opposing side pieces, said electrical insulating plates and each of said pairs of electrically-connected first and second bus bar conductors when said fastener is tightened.

7. The adjustable busway elbow of claim 1, wherein said first end portion and said opposing first end portion of each of said pairs of electrically-connected first and second bus bar conductors extend outwardly from said first and second bus bar end stubs, respectively, for interconnecting with the busway sections.

* * * * *